(12) United States Patent  
Tobe et al.

(10) Patent No.: US 8,717,557 B2  
(45) Date of Patent: May 6, 2014

(54) SPECTROPHOTOMETER AND METHOD FOR DETERMINING PERFORMANCE THEREOF

(75) Inventors: Hayato Tobe, Mito (JP); Yoichi Sato, Hitachinaka (JP); Hiroyasu Ishida, Tokai (JP); Takayuki Wakui, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 13/578,581

(22) PCT Filed: Feb. 16, 2011

(86) PCT No.: PCT/JP2011/053267
§ 371 (c)(1),
(2), (4) Date: Aug. 10, 2012

(87) PCT Pub. No.: WO2011/102377
PCT Pub. Date: Aug. 25, 2011

(65) Prior Publication Data
US 2012/0307240 A1    Dec. 6, 2012

(30) Foreign Application Priority Data

Feb. 18, 2010 (JP) .................................. 2010-033182

(51) Int. Cl.
*G01J 3/44* (2006.01)
(52) U.S. Cl.
USPC .......................................................... 356/300
(58) Field of Classification Search
USPC .......................................................... 356/300
See application file for complete search history.

(56) References Cited

U.S. PATENT DOCUMENTS

| 4,241,998 | A | * | 12/1980 | Farkas et al. .................. 356/319 |
| 6,226,084 | B1 | | 5/2001 | Tormod |
| 7,151,600 | B2 | | 12/2006 | Imura |
| 7,710,560 | B2 | * | 5/2010 | Holub ........................... 356/300 |
| 2005/0236563 | A1 | | 10/2005 | Busch et al. |

FOREIGN PATENT DOCUMENTS

| JP | 58-16533 U | 2/1983 |
| JP | 62-015148 A | 1/1987 |
| JP | 62-015418 A | 1/1987 |
| JP | 10-132743 A | 5/1998 |
| JP | 2000-505555 A | 5/2000 |
| JP | 2003-166878 A | 6/2003 |
| JP | 2005-043153 A | 2/2005 |

OTHER PUBLICATIONS

Office Action issued Mar. 19, 2013, in Japanese Patent Application No. 2010-033182.

* cited by examiner

*Primary Examiner* — Tu Nguyen
(74) *Attorney, Agent, or Firm* — Miles & Stockbridge P.C.

(57) ABSTRACT

A spectrophotometer includes a xenon flash lamp, a spectroscope, and a light detector, wherein the spectrophotometer is configured to arrange a low-pressure mercury lamp on a bundle of light rays between the xenon flash lamp and the spectroscope on an as needed basis upon a performance determination of the spectrophotometer, and has a shutter mechanism that switches between shielding the bundle of light rays emitted from the low-pressure mercury lamp and allowing the bundle of light rays to pass through. A processing unit determines the performance of the spectrophotometer by detecting each of the light intensities with the light detector at the time when shielding the bundle of light rays and at the time when allowing the bundle of light rays by operating the shutter mechanism.

6 Claims, 3 Drawing Sheets

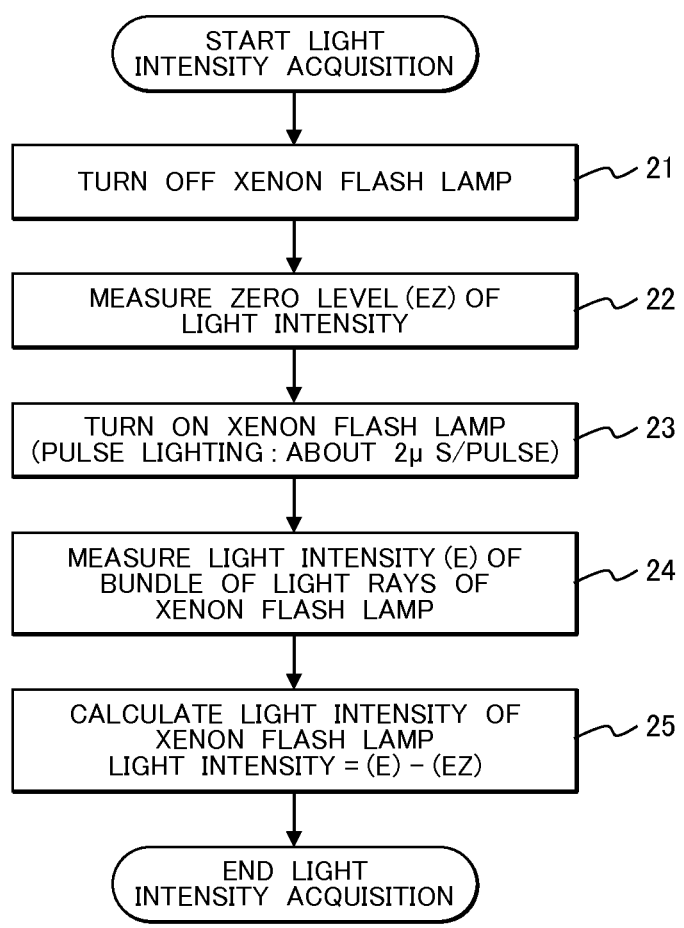

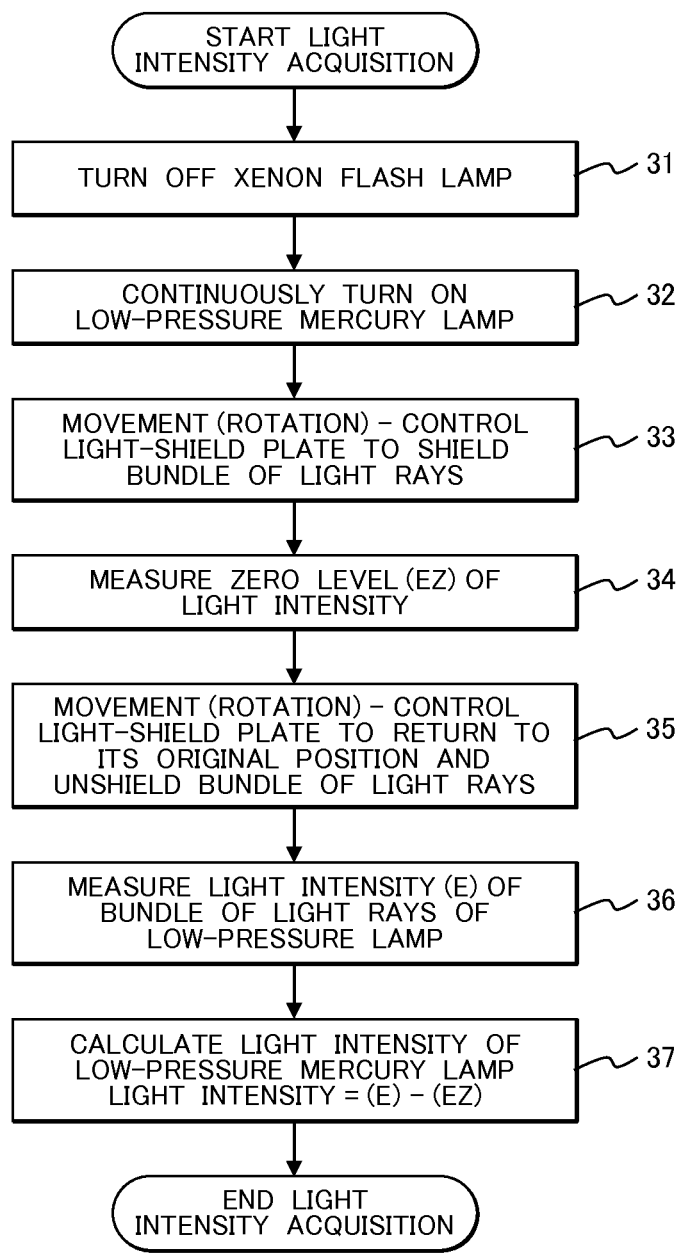

SPECTROPHOTOMETER AND METHOD FOR DETERMINING PERFORMANCE THEREOF

TECHNICAL FIELD

The present invention relates to a spectrophotometer using a xenon flash lamp for a light source that emits a bundle of light rays taken as light to be measured, and particularly to a configuration of the spectrophotometer suitable to measure and confirm its performance, and a performance determination method thereof.

BACKGROUND ART

In the field of a spectrophotometer, a device user (manage) regularly manages the performance of the spectrophotometer to check the accuracy of measurement. A method for testing the performance has been defined in the performance indication method (Japan Analytical Instruments Manufacturers Association) of JAIMAS 0001 ultraviolet and visible spectrophotometer, and JIS K0115 general rules for molecular absorptiometric analysis (Japanese Industrial Standards Committee).

The "wavelength accuracy" and the "resolution" have been defined in test items thereof. The "wavelength accuracy" is defined by a wavelength representing a difference (wavelength drift) between an actual wavelength of maximum light intensity of a monochromatic light, which is emitted from a spectroscope with a deuterium discharge tube or a low-pressure mercury lamp as a light source, and a set wavelength of the device. Alternatively, it is defined by a wavelength representing a difference (wavelength drift) between a wavelength at a minimum point of transmittance and the set wavelength, by using a wavelength calibrating optical filter. The "resolution" is defined by representing a wavelength having a spectrum width of a monochromatic light emitted from a spectroscope with the deuterium discharge tube or the low-pressure mercury lamp as the light source. Alternatively, upon measuring the absorption spectrum of a certain substance (e.g.: benzene vapor), the "resolution" is defined by representing a difference in wavelength between neighboring peaks with an extent capable of being separated from each other.

The conventional spectrophotometer has used a deuterium discharge tube and a halogen lamp as a light source that emits a bundle of light rays taken as light to be measured. When determining the "wavelength accuracy", it is determined by a difference between an actually measured wavelength having a maximum light intensity and each of set bright-line spectrum wavelengths (486.0 nm and 656.1 nm) of a deuterium discharge tube, which is mounted on a device in advance to use for the determination. Even when determining the "resolution", the bright-line spectrum wavelengths (486.0 nm and 656.1 nm) of the deuterium discharge tube are measured, wavelengths corresponding to ½ of the maximum light intensity are determined on longer and shorter wavelength sides with respect to the maximum light intensity, and a difference between a longer wavelength-side wavelength corresponding to ½ of the maximum light intensity and a shorter wavelength-side wavelength corresponding to ½ of the maximum light intensity is determined, thereby determining the resolution.

Incidentally, for example, Patent Document 1 (Japanese Unexamined Patent Application Publication (Translation of PCT Application) No. 2000-505555) discloses of using a xenon flash lamp as a light source for a spectrophotometer. The Patent Document 1 discloses that a calibration check on a device is performed using specific bright lines of the spectrum of the xenon flash lamp. Since no deuterium discharge tube or the like is however mounted to the device, the determinations of the "wavelength accuracy" and the "resolution" using the deuterium discharge tube or the like cannot be performed.

Therefore, in the spectrophotometer using the xenon flash lamp, the "wavelength accuracy" or the like is determined by using bright-line spectrum wavelengths (229 nm, 248 nm, 485 nm, 529 nm, 823 nm, 882 nm) of the xenon flash lamp, or optical filters of neodymium filters (e.g., 441.1 nm, 472.9 nm and other seven wavelengths) in which absorption spectra are individually predetermined by the official laboratory, or holmium filters (e.g., 279.3 nm, 2 87.6 nm and other seven wavelengths).

PRIOR ART DOCUMENT

Patent Document

Patent Document 1 Japanese Unexamined Patent Application Publication (Translation of PCT Application) No, 2000-505555

SUMMARY OF THE INVENTION

Problems that the Invention is to Solve

From the standpoint of users using the spectrophotometer having both of the deuterium discharge tube and the halogen lamp as the light source, they since need to make comparison with data stored in the past, they seem to desire to also perform the confirmation of the "wavelength accuracy" or the like with the bright-line spectrum wavelengths of the conventional deuterium discharge tube or low-pressure mercury lamp.

However, in the spectrophotometer using the xenon flash lamp as the light source that emits the bundle of light rays taken as the light to be measured, it is not capable of confirming the "wavelength accuracy" or the like because no deuterium discharge tube or the like is mounted thereto. Further, since the deuterium discharge tube or the low-pressure mercury lamp is of the light source used in continuous lighting in spite of that the xenon flash lamp is of pulse lighting, it cannot be used for measurement even when it is merely just arranged as the light source. The reason is as follows. In the case of the pulse lighting, in order to eliminate effects of external light or a temperature drift of a detector, measuring a zero level of light intensity at the turning off of the light source, measuring the light intensity of the bundle of light rays used for the measurement at the turning on of the light source, and assuming a difference between the two measured to be a correct light intensity to be measured.

Therefore, even if the continuously-lighting light source is made incident on the spectroscope as it is, the spectrophotometer having used the xenon flash lamp is not capable of coping with the measurement of the light intensity. Incidentally, the optical filters in which the absorption spectra are individually predetermined by the official laboratory are expensive, and the optical filters are generally predetermined at a solution of 1 nm. For the reason, when using a spectrophotometer in which the resolution inherent in the device exceeds 1 nm, it is not easy to obtain a filter adapted to the device.

Furthermore, even when intending to determine the "resolution", there is also a problem that it is difficult to obtain a substance neighboring absorption spectra corresponding to the resolution inherent in the device. In addition to that, in the case of the xenon flash lamp, since there are a lot of neighboring lines in the bright-line spectrum desired to be used for determination of the "resolution". Therefore, in the case of a spectrophotometer in which the resolution of a device exceeds 3 nm, a method of determining wavelengths corresponding to ½ of the maximum light intensity on the longer and shorter wavelength sides, and determining the difference between the longer wavelength-side wavelength corresponding to ½ of the maximum light intensity and the shorter wavelength-side wavelength corresponding to ½ of the maximum light intensity, is not capable of determining the accurate "resolution" under the influence of the neighboring lines.

The present invention has been made with consideration of such conventional technical problem. An object of the present invention is, in a spectrophotometer using a xenon flash lamp as a light source that emits a bundle of light rays taken as light to be measured, to provide the spectrophotometer capable of also using a low-pressure mercury lamp and carrying out the performance determination capable of comparing with data stored in the past, and a method for the performance determination.

Means for Solving the Problems

The spectrophotometer using the xenon flash lamp for the light source is not equipped with the deuterium discharge lamp or the low-pressure mercury lamp. Even if allowing a light from such a continuously-lighting light source to enter the spectroscope, the zero level of the light intensity cannot be measured. Furthermore, even if using the deuterium discharge lamp or low-pressure mercury lamp used for continuous lighting by turning off the lamp again after turning off it, it has a characteristic of drifting for a time interval (about 5 to 20 minutes) until the light intensity reaches stability. Therefore, it is not possible to perform a stable determination even if it is pulse-lighted and the light thereof is made incident on the spectroscope because it has the characteristic of drifting.

In consideration of such a situation, the feature of the present invention is in that, in a spectrophotometer using a xenon flash lamp as a light source, the spectrophotometer is configured to arrange a low-pressure mercury lamp on a bundle of light rays between the xenon flash lamp and a spectroscope on an as needed basis, and has a shutter mechanism that switches between shielding the bundle of light rays emitted from the low-pressure mercury lamp and allowing the bundle of light rays to pass through.

Upon its performance determination, a low-pressure mercury lamp is arranged on the bundle of light rays between the xenon flash lamp and the spectroscope. In a state in which the low-pressure mercury lamp is lighted, the bundle of light rays emitted from the low-pressure mercury lamp is shielded and then allowed to pass through. The light intensities at the light shielding and at the light passing through are respectively detected by a light detector, thereby enabling to do the performance determination using bright lines of the low-pressure mercury lamp.

Advantages of the Invention

According to the present invention, a spectrophotometer using a xenon flash lamp as a light source, which enables to do performance determination using a low-pressure mercury lamp, and a method of making even its determination easy can be realized. It is therefore possible to perform spectroscopic analysis which allows the performance determination to compare with data stored in the past.

BRIEF DESCRIPTION OF THE DRAWINGS

FIG. 2 is a light-intensity acquisition flowchart of a xenon flash lamp; and

FIG. 3 is a light-intensity acquisition flowchart of a low-pressure mercury lamp.

BEST MODE FOR CARRYING OUT THE INVENTION

Figure 1:
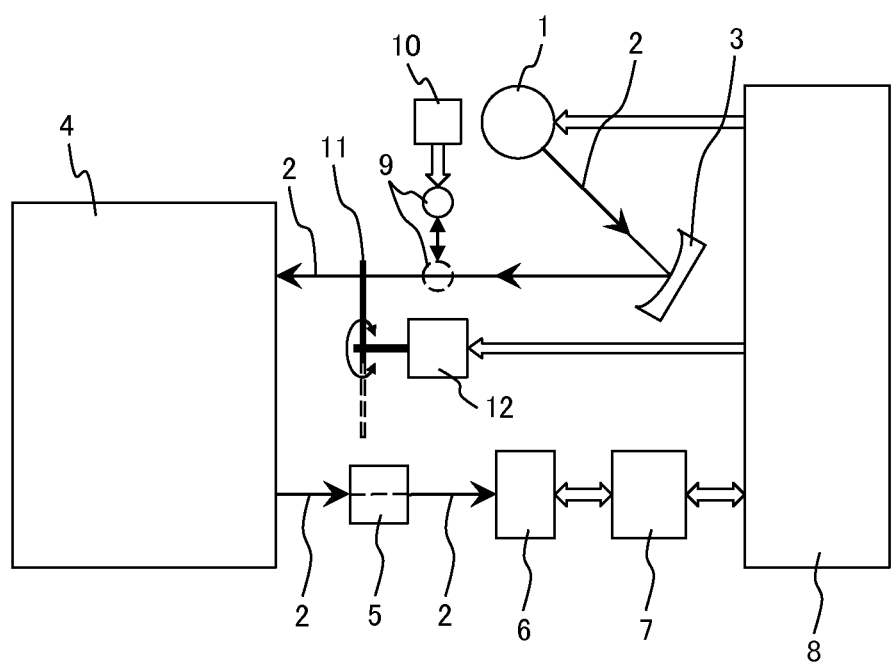
FIG. 1 is a schematic configuration diagram related to one embodiment of a spectrophotometer according to the present invention.

While practical ingenuity also has further been disclosed in embodiments to be described below in addition to the above object and features of the present invention, they will be described with reference to FIGS. 1 through 3.

FIG. 1 is a schematic configuration diagram of a spectrophotometer according to the present invention. Upon its normal measurement, a bundle of light rays 2 as a light to be measured is emitted from a xenon flash lamp 1 and focused with a concave mirror 3, so that the focused light enters a spectroscope 4. The bundle of light rays 2 emitted from the xenon flash lamp 1 is spectrally separated into arbitrarily-defined wavelengths by a spectrally-separating unit comprised of a diffraction grating or the like provided within the spectroscope 4, and outputted from the spectroscope 4. The outputted bundle of light rays 2 is introduced into a photodetector 6 in response to light transmission and absorption by a sample 5. The light detected by the photodetector 6 is digitally processed by an A/D converter 7 and thereafter transmitted to a central processing unit 8 as data, followed by being used in various arithmetic operations as light intensity values. That is, the arithmetic operations on the "wavelength accuracy" and the "resolution" or the like described at the outset are performed by the central processing unit 8 as a determination unit and outputted and displayed.

FIG. 2 is a light intensity acquisition flowchart of the xenon flash lamp 1, which is the normal measurement. A zero level (EZ) of light intensity is measured (Step 22) in a state in which the xenon flash lamp 1 has been turned off (Step 21). Then, the xenon flash lamp 1 is pulse-lighted (Step 23) to measure the light intensity (E) of the bundle of light rays 2 (Step 24). The light intensity is determined by (E)-(EZ) (Step 25).

When the "wavelength accuracy" or the "resolution" is determined, the xenon flash lamp 1 is controlled by a central processing unit 8 so as to turn off, and a low-pressure mercury lamp 9 is automatically or manually arranged on the bundle of light rays 2 between the xenon flash lamp 1 and the spectroscope 4. The low-pressure mercury lamp 9 is continuously lighted by a power supply 10 to make the bundle of light rays 2 enter the spectroscope 4. The spectrally-separating unit of the spectroscope 4 spectrally separates the bundle of light rays 2 from the low-pressure mercury lamp 9 into arbitrarily-defined wavelengths, which are outputted from the spectroscope 4. The outputted bundle of light rays 2 is introduced into the photodetector 6 in response to the light transmission and absorption by the sample 5. The light introduced into the photodetector 6 is digitally processed by the A/D converter 7. The processed data is transmitted to the central processing unit 8 and handled as an intensity value of the light.

A motor 12 as a light-shield plate moving (rotating) actuator and a light-shield plate 11 constitutes a shutter mechanism which shields the bundle of light rays from the low-pressure mercury lamp 9 and allows the same to pass therethrough. That is, the light-shield plate 11 is controlled by the central processing unit 8 in such a manner that, when the zero level is measured, the light-shield plate moving (rotating) motor 12 moves the light-shield plate 11 to a position where the bundle of light rays 2 is shielded, and when the light intensity of the low-pressure mercury lamp 9 is measured, the light-shield plate moving (rotating) motor 12 moves the light-shield plate 11 to a position where the bundle of light rays 2 is not shielded.

FIG. 3 is a flowchart for acquiring the intensity of light of the low-pressure mercury lamp 9 in order to measure the "wavelength accuracy" or the "resolution". The zero level (EZ) of the light intensity is measured (Step 34) in a state in which the xenon flash lamp 1 is turned off (Step 31), the low-pressure mercury lamp 9 is continuously lit (Step 32) and the light-shield plate 11 is movement (rotation)-controlled to shield the bundle of light rays 2 (Step 33). Next, the light shield plate 11 is movement (rotation)-controlled to return to its original position (Step 35). The light intensity (E) of the low-pressure mercury lamp 9 is measured by the photodetector 6 in a state in which the bundle of light rays 2 is not shielded (Step 36). The light intensity at this time is determined by (E)-(EZ) (Step 37).

The determination of the "wavelength accuracy" is performed by determining a difference between each of bright-line spectrum wavelengths (253.65 nm, 435.84 nm and 546.07 nm) of the low-pressure mercury lamp 9 and the wavelength of the measured maximum light intensity. The determination of the "resolution" is performed by measuring each of the bright-line spectrum wavelengths (253.65 nm, 435.84 nm and 546.07 nm) of the low-pressure mercury lamp 9, determining wavelengths corresponding to ½ of the maximum light intensity on the longer and shorter wavelength sides, and determining a difference between a longer wavelength-side wavelength corresponding to ½ of the maximum light intensity and a shorter wavelength-side wavelength corresponding to ½ of the maximum light intensity.

From the foregoing, the measurements of the zero level (shielded state) and the light intensity of the low-pressure mercury lamp 9 can be carried out on a time-sharing basis even in the state in which the low-pressure mercury lamp 9 is continuously lighted. It is therefore possible to determine the "wavelength accuracy" or the "resolution" by employing the low-pressure mercury lamp 9.

Thus, according to the present embodiment, even in the case of a spectrophotometer in which the xenon flash lamp is used for a light source that needs the accuracy of measurement, the tests on the "wavelength accuracy" and the "resolution" in the test items described in the performance indication method (Japan Analytical Instruments Manufacturers Association) of JAIMAS 0001 ultraviolet and visible spectrophotometer can be realized.

A user that has heretofore used spectrophotometers in which light sources are a deuterium discharge lamp and a halogen lamp, is able to confirm the "wavelength accuracy" at the conventional bright-line spectrum wavelengths of the low-pressure mercury lamp. It is therefore possible to make comparison with conventionally-stored analytic data and carry on a spectroscopic analysis.

In the case of such a spectrophotometer that the resolution of a device exceeds 3 nm, the xenon flash lamp is affected by neighboring lines, so that the accurate determination of "resolution" could not be performed. Since it is however possible to use bright-line spectrum wavelengths of a low-pressure mercury lamp free of the neighboring lines, the accurate "resolution" can also be performed.

In the above embodiment, although the light-shield plate moving (rotating) motor 12 that constitutes the shutter mechanism is controlled by the central processing unit 8 to move the position of the light-shield plate 11, the present invention is however not limited to this, and instead only the light-shield plate 11 may be provided within the shutter mechanism so as to be moved by the operation of the user. Although the arithmetic operations for the determination of the "wavelength accuracy" or the "resolution" are all performed by the central processing unit 8, it is needless to say that the present invention can be used by performing application or modifications according to usage environments as in the case of digitalization of the output of the photodetector 6, execution of its arithmetic operation by a user's computer, etc.

EXPLANATION OF REFERENCE NUMERALS

1 . . . xenon flash lamp
2 . . . bundle of light rays
3 . . . concave mirror
4 . . . spectroscope
5 . . . sample
6 . . . photodetector (photodiode)
7 . . . A/D coverter
8 . . . central processing unit
9 . . . low-pressure mercury lamp
10 . . . power supply of low-pressure mercury lamp
11 . . . light-shield plate
12 . . . light-shield plate moving (rotating) motor.

The invention claimed is:

1. A spectrophotometer comprising a xenon flash lamp which emits a bundle of light rays by pulse lighting, a spectroscope which spectrally separates the bundle of light rays into arbitrarily-defined wavelengths and irradiates a sample therewith, and a light detector which detects a light intensity of the bundle of light rays allowing to pass through the sample,
    wherein the spectrophotometer is configured to arrange a low-pressure mercury lamp on a bundle of light rays between the xenon flash lamp and the spectroscope on an as needed basis upon a determination of the spectrophotometer, and has a shutter mechanism that switches between shielding the bundle of light rays emitted from the low-pressure mercury lamp and allowing the bundle of light rays to pass through,
    and a processing unit determines the performance of the spectrophotometer by detecting each of the light intensities with the light detector at the time when shielding the bundle of light rays and at the time when allowing the bundle of light rays by operating the shutter mechanism.

2. The spectrophotometer according to claim 1, wherein the shutter mechanism is equipped with a light-shield plate which shields the bundle of light rays from the low-pressure mercury lamp, and an actuator which operates the light-shield plate to shield the bundle of light rays from the low-pressure mercury lamp and allow the same to pass therethrough.

3. The spectrophotometer according to claim 2, including a determination unit which determines the "wavelength accuracy" of the spectroscope or the "resolution" of the wavelength of the spectroscope, using an output of the light detector at the time that the bundle of light rays from the low-pressure mercury lamp is shielded by the light-shield plate, and an output of the light detector at the time that the bundle of light rays from the low-pressure mercury lamp is allowed to pass through.

4. A method for determining the performance of a spectrophotometer comprising a xenon flash lamp which emits a bundle of light rays by pulse lighting, a spectroscope which spectrally separates the bundle of light rays into arbitrarily-defined wavelengths and irradiates a sample therewith, and a light detector which detects a light intensity of the bundle of light rays passing through the sample, said method comprising:
  arranging a low-pressure mercury lamp on the bundle of light rays between the xenon flash lamp and the spectroscope,
  turning off the xenon flash lamp,
  switching between shielding the bundle of light rays from the low-pressure mercury lamp and allowing the bundle of light rays to passing through by operating the shutter mechanism, in a state in which the low-pressure mercury lamp is continuously lighted, and
  detecting the light intensities at the time when shielding the bundle of light rays and at the time when allowing the bundle of light rays with the light detector to determine the performance of the spectrophotometer.

5. The method according to claim 4, wherein the "wavelength accuracy" is determined by using bright lines of the low-pressure mercury lamp.

6. The method according to claim 4, wherein the "resolution" of the wavelength is determined by using bright lines of the low-pressure mercury lamp.

* * * * *